US008132210B2

United States Patent
Ackley et al.

(10) Patent No.: US 8,132,210 B2
(45) Date of Patent: Mar. 6, 2012

(54) VIDEO DISC PLAYER FOR OFFERING A PRODUCT SHOWN IN A VIDEO FOR PURCHASE

(75) Inventors: Jonathan Ackley, Glendale, CA (US); Christopher T. Carey, Santa Clarita, CA (US); Bennet S. Carr, Burbank, CA (US); Kathleen S. Poole, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2653 days.

(21) Appl. No.: 10/859,732

(22) Filed: Jun. 2, 2004

(65) Prior Publication Data

US 2005/0022226 A1    Jan. 27, 2005

Related U.S. Application Data

(60) Provisional application No. 60/475,251, filed on Jun. 2, 2003.

(51) Int. Cl.
*G06F 3/00* (2006.01)
*H04N 7/173* (2011.01)
*H04N 7/16* (2011.01)
*G06Q 30/00* (2006.01)

(52) U.S. Cl. .......... 725/60; 725/109; 725/110; 725/112; 725/113; 725/135; 705/26.1; 705/27.1

(58) Field of Classification Search ................ 725/60, 725/109, 110, 112, 113, 135; 705/26.1, 27.1
See application file for complete search history.

(56) References Cited

U.S. PATENT DOCUMENTS

| 4,333,152 A | 6/1982 | Best |
| 4,792,895 A | 12/1988 | Tallman |
| 4,831,541 A | 5/1989 | Eshel |
| 5,522,075 A | 5/1996 | Robinson et al. |

(Continued)

FOREIGN PATENT DOCUMENTS

EP    0982947    3/2000

(Continued)

OTHER PUBLICATIONS

Adve, et al., *LLVA: A Low-level Virtual Instruction Set Architecture*, In Proc. 36$^{th}$ Symposium on Microarchitecture, (2003 IEEE).

(Continued)

*Primary Examiner* — Hoang-Vu A Nguyen-Ba
(74) *Attorney, Agent, or Firm* — Farjami & Farjami LLP

(57) ABSTRACT

There is provided a method for use by a video disc player for offering a product shown in a video for purchase. The method comprises examining a disc containing the video to determine whether the disc contains trigger data associated with the video; requesting the trigger data associated with the video from a remote server if the examining determines that the disc does not contain the trigger data associated with the video; downloading the trigger data associated with the video from the remote server using a network connection; and storing the trigger data associated with the video in a memory of the video player, wherein at least one trigger data includes a time indicating when a trigger is to occur during the playing of the video on the disc, the at least one trigger corresponding to the display of a product shown in the video.

12 Claims, 2 Drawing Sheets

U.S. PATENT DOCUMENTS

| | | | |
|---|---|---|---|
| 5,548,340 A | 8/1996 | Bertram | |
| 5,606,374 A | 2/1997 | Bertram | |
| 5,634,850 A | 6/1997 | Kitahara et al. | |
| 5,699,123 A | 12/1997 | Ebihara et al. | |
| 5,708,845 A | 1/1998 | Wistendahl et al. | |
| 5,818,439 A | 10/1998 | Nagasaka et al. | |
| 5,892,521 A | 4/1999 | Blossom et al. | |
| 5,893,084 A | 4/1999 | Morgan et al. | |
| 5,929,849 A | 7/1999 | Kikinis | |
| 5,956,092 A | 9/1999 | Ebihara et al. | |
| 5,987,509 A | 11/1999 | Portuesi | |
| 6,069,669 A | 5/2000 | Park et al. | |
| 6,262,746 B1 | 7/2001 | Collins | |
| 6,362,816 B1 | 3/2002 | Kawanami et al. | |
| 6,373,500 B1 | 4/2002 | Daniels | |
| 6,407,779 B1 | 6/2002 | Herz | |
| 6,493,038 B1 | 12/2002 | Singh et al. | |
| 6,539,240 B1 | 3/2003 | Watanabe | |
| 6,570,587 B1 | 5/2003 | Efrat et al. | |
| 6,795,973 B1 * | 9/2004 | Estipona | 725/136 |
| 6,868,449 B1 | 3/2005 | Miyamoto et al. | |
| 7,027,101 B1 | 4/2006 | Washino | |
| 7,043,726 B2 | 5/2006 | Scheetz et al. | |
| 7,051,005 B1 | 5/2006 | Peinado et al. | |
| 7,069,311 B2 | 6/2006 | Gupta et al. | |
| 7,162,531 B2 | 1/2007 | Paz et al. | |
| 7,210,144 B2 | 4/2007 | Traut | |
| 7,224,401 B2 * | 5/2007 | Ackley et al. | 348/556 |
| 2001/0021926 A1 | 9/2001 | Schneck et al. | |
| 2002/0054049 A1 | 5/2002 | Toyoda et al. | |
| 2002/0059456 A1 | 5/2002 | Ha et al. | |
| 2002/0059610 A1 * | 5/2002 | Ellis | 725/58 |
| 2002/0060750 A1 | 5/2002 | Istvan et al. | |
| 2002/0078456 A1 | 6/2002 | Hudson | |
| 2002/0083449 A1 | 6/2002 | Im | |
| 2002/0095677 A1 | 7/2002 | Davis | |
| 2002/0097280 A1 | 7/2002 | Loper et al. | |
| 2002/0138851 A1 | 9/2002 | Lord et al. | |
| 2002/0141582 A1 | 10/2002 | Kocher et al. | |
| 2002/0161996 A1 | 10/2002 | Koved et al. | |
| 2002/0162117 A1 * | 10/2002 | Pearson et al. | 725/109 |
| 2002/0169987 A1 | 11/2002 | Meushaw et al. | |
| 2002/0184520 A1 | 12/2002 | Bush et al. | |
| 2002/0194604 A1 | 12/2002 | Sanchez | |
| 2002/0194612 A1 | 12/2002 | Lundberg et al. | |
| 2003/0046557 A1 | 3/2003 | Miller et al. | |
| 2003/0084441 A1 * | 5/2003 | Hunt | 725/32 |
| 2003/0084460 A1 | 5/2003 | Chung | |
| 2003/0110507 A1 * | 6/2003 | Dimitrova et al. | 725/110 |
| 2003/0145331 A1 * | 7/2003 | Escobar et al. | 725/110 |
| 2003/0167465 A1 * | 9/2003 | Davis et al. | 725/32 |
| 2003/0170011 A1 | 9/2003 | Otsuka et al. | |
| 2003/0177497 A1 * | 9/2003 | Macrae et al. | 725/60 |
| 2003/0182658 A1 * | 9/2003 | Alexander | 725/60 |
| 2003/0190950 A1 | 10/2003 | Matsumoto | |
| 2003/0196100 A1 | 10/2003 | Grawrock et al. | |
| 2004/0047588 A1 | 3/2004 | Okada et al. | |
| 2004/0067048 A1 | 4/2004 | Seo et al. | |
| 2004/0133794 A1 | 7/2004 | Kocher et al. | |
| 2004/0175218 A1 | 9/2004 | Katzer | |
| 2004/0268135 A1 | 12/2004 | Zimmer | |
| 2005/0019015 A1 | 1/2005 | Ackley et al. | |
| 2005/0020359 A1 | 1/2005 | Ackley et al. | |
| 2005/0022226 A1 | 1/2005 | Ackley et al. | |
| 2005/0223220 A1 | 10/2005 | Campbell | |
| 2006/0069925 A1 | 3/2006 | Nakai et al. | |
| 2007/0033419 A1 | 2/2007 | Kocher et al. | |

FOREIGN PATENT DOCUMENTS

| | | |
|---|---|---|
| EP | 1 304 876 | 4/2003 |
| JP | 2001-297233 | 10/2001 |
| JP | 2001-326907 | 11/2001 |
| JP | 2002152616 | 5/2002 |
| JP | 2002-232866 | 8/2002 |
| KR | 2001-0096551 | 11/2001 |
| KR | 10-2002-0050229 | 6/2002 |
| KR | 2003-0010348 | 2/2003 |
| WO | WO97/12342 | 4/1997 |
| WO | 01/65832 | 9/2001 |
| WO | 01/73525 | 10/2001 |
| WO | WO-01/73525 * | 10/2001 |
| WO | 02/17643 | 2/2002 |
| WO | WO02/19715 | 3/2002 |
| WO | WO 02/058393 | 7/2002 |

OTHER PUBLICATIONS

Kocher, et al., *Self-Protecting Digital Content*, Cryptography Research, Inc., pp. 1-14 (2002-2003).

*Trusted Computing Platform Alliance (TCPA) Main Specification Version 1.1b*, Trusted Computing Group, (Feb. 2002).

Schödl, et al., *Controlled Animation of Video Sprites*, Georgia Institute of Technology college of Computing, pp. 121-127, 196 (2002).

\* cited by examiner

VIDEO DISC PLAYER FOR OFFERING A PRODUCT SHOWN IN A VIDEO FOR PURCHASE

RELATED APPLICATIONS

This application claims priority to U.S. Provisional Patent Application No. 60/475,251, filed Jun. 2, 2003, which is incorporated herein by reference in its entirety. This application is also related to U.S. Utility patent application Ser. No. 10/859,885, entitled "System And Method Of Programmatic Window Control For Consumer Video Players"; U.S. Utility patent application Ser. No. 10/860,572, entitled "System And Method Of Interactive Video Playback"; U.S. Utility patent application Ser. No. 10/859,888, entitled "System And Method Of Dynamic Interface Placement Based On Aspect Ratio"; and U.S. Utility patent application Ser. No. 10/859,887, entitled "Video Playback Image Processing"; all of which are filed concurrently herewith on Jun. 2, 2004, and incorporated by reference herein in their entirety.

BACKGROUND

1. Field

This disclosure relates to new systems and methods for providing commerce on video discs such as DVD's.

2. General Background and State of the Art

Interactive television and television commerce is widely pursued and currently understood by numerous companies. Among companies developing software for interactive TV applications are WINK, OPENTV, ABC's ENHANCED TV and GOLDPOCKET INTERACTIVE. Companies like SCIENTIFIC ATLANTA AND MOTOROLA create set-top boxes for interactive television systems.

There is also an enhanced content forum committed to accelerating the creation and distribution of enhanced television programs called the ADVANCED TELEVISION ENHANCEMENT FORUM, or ATVEF. ATVEF is a cross industry alliance of companies representing the broadcast and cable networks, television transports, consumer electronics, and PC industries. This alliance of companies has defined protocols for Hypertext Markup Language (HTML)-based enhanced television, which allow content creators to deliver enhanced programming over all forms of transport (analog, digital, cable, and satellite) to any intelligent receivers.

Most implementations of interactive television involve sending triggers or multimedia assets to the user via the broadcast mechanism (cable modem, Internet connection) to a PC or television set-top box. The broadcast center sends a signal to the set-top box to display the content. If the user's set-top box has an Internet back-channel, the user may then use a keyboard, mouse or remote-control to request further information on an advertised product, receive a coupon, or even purchase the advertised product.

Set-top box based television commerce has yet to catch on in a major way in the United States. In their current implementations, set-top boxes have limited appeal to consumers. The boxes are expensive, slow and have limited display capabilities. Also, there are technical difficulties in delivering a large quantity of appealing and rich advertising content to the boxes through traditional broadcast technology.

Consequently, there is little content for television commerce and the experience provided by existing content is under whelming compared to the experience provided by Internet commerce.

It also is well known that companies pay large amounts of money to include their products in movies and other film productions. Showing a famous actor drinking their brand of soft drink, or wearing a new design of shoes or sunglasses, for example, can launch consumer trends, especially among certain targeted age groups.

Therefore it is desired to facilitate the ability for viewers to purchase products that are featured in movies or other video productions.

SUMMARY OF THE INVENTION

The present disclosure provides the ability to purchase products featured in a video through use of a video playback device, such as a DVD or High-Definition video player. Triggers are provided with the video that correspond to locations within the video where a product is shown. The playback device is configured to recognize these triggers and indicate to the user that a product may be available for purchase. When a product available for purchase is displayed in the video, an indicator appears on the screen which indicates to the user that this product is available for purchase. The indicator may for example be visual such as an icon or graphic. The indicator may also be a sound.

In one embodiment, a video disc includes a video that is specially encoded with triggers that correspond with the display of a product for advertisement or sale. The video disc may for example be a DVD, and the video may be a movie.

In another embodiment, a video disc includes a video and trigger data. However, the trigger data need not be encoded with the video. For example, the triggers may comprise a time indicating the time during the video when or where the trigger should occur. The triggers may be compiled as a list, and saved to a file. In another embodiment, the triggers may be listed as database entries in a database table. In yet another embodiment, the triggers may be encoded on a separate video track that plays simultaneously with the video. The file or database table may be included on the video disc.

In another embodiment, the trigger data is provided separate from the video. For example, the triggers may be provided to the video playback device through an Internet connection and stored in memory on the video playback device for access at a later time. Therefore, the video disc need not contain trigger data on the disc in order to provide the ability to purchase products. Instead, the video playback device requests the trigger data corresponding to the video on the video disc through a communications link such as an Internet connection. The trigger data may be downloaded and saved to memory on the playback device. In another embodiment, a content provider transmits the trigger data to the playback device without the playback device requesting the data.

Purchase of a product shown in a video may be accomplished in a variety of different ways. In one embodiment, the user views a video having corresponding trigger data. When a product is shown having a corresponding trigger, an indicator is displayed. The user may continue viewing the video or interrupt the video.

In one embodiment, an on screen display prompts the user as to whether or not they would like to add the product to their "wish list." The user responds by using their remote control. The user can continue to watch the video and visit the wish list at a later time in order to complete purchase of a product.

Alternatively, in other embodiments, the user may interrupt play of the video to purchase the product. Purchase of the product may involve directing the viewer to a website where the viewer completes the purchase transaction. The video playback device therefore may be configured to access and display web sites.

In some embodiments, detailed product information about products displayed in the video is provided to viewers. In such embodiments, triggers are used in a similar way, however the user may request to view more detailed information on the product. The product information may be downloaded to the playback device through an Internet connection, or may be provided along with the video on the video disc.

The foregoing and other objects, features, and advantages of the present disclosure will be become apparent from a reading of the following detailed description of exemplary embodiments thereof, which illustrate the features and advantages of the present disclosure.

DETAILED DESCRIPTION

In the following description of exemplary embodiments, reference is made to the accompanying drawings which form a part thereof, and in which are shown by way of illustration specific embodiments in which the present disclosure may be practiced. It is to be understood that other embodiments may be utilized and structural and functional changes may be made without departing from the scope of the present disclosure.

The present disclosure provides the ability to purchase products featured in a video through use of a video playback device, such as a DVD or High-Definition video player. Triggers are provided with the video that correspond to locations within the video where a product is shown. The playback device is configured to recognize these triggers and indicate to the user that a product may be available for purchase. When a product available for purchase is displayed in the video, an indicator appears on the screen which indicates to the user that this product is available for purchase. The indicator may for example be visual such as an icon or graphic. The indicator may also be a sound.

Figure 1:
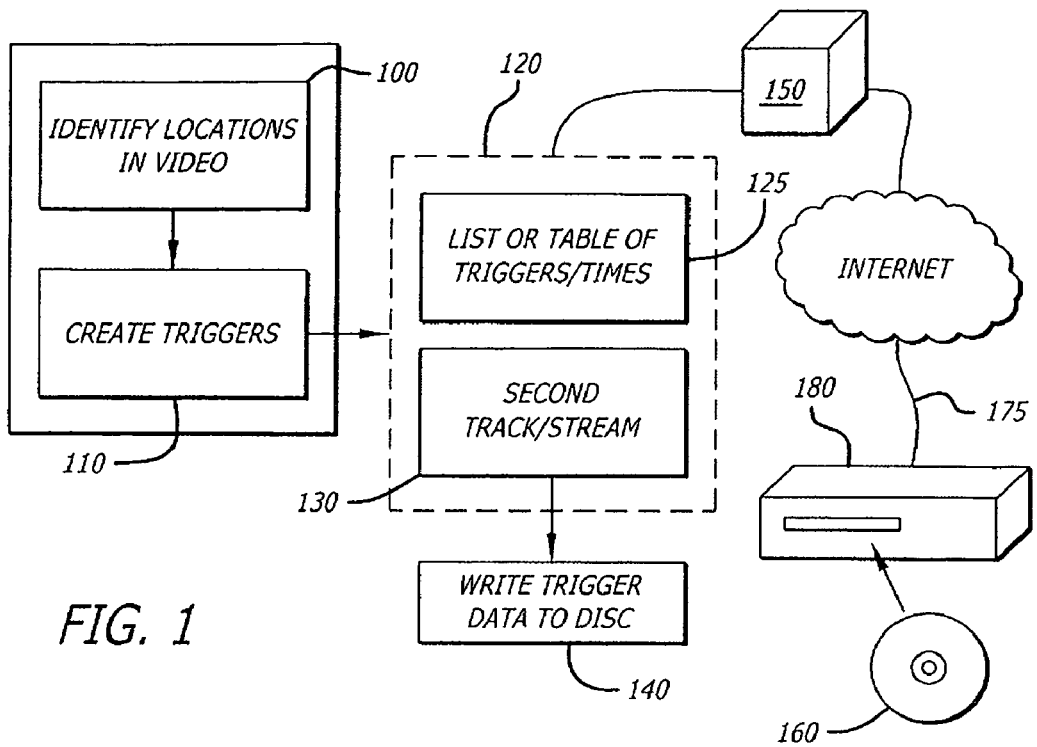
FIG. 1 is a block diagram illustrating a system in accordance with the present disclosure.

FIG. 1 is a block diagram of an exemplary video commerce system in accordance with the present disclosure.

As indicated at block 100, a video is first examined for locations within the video where products are displayed that are to be offered to the viewer for purchase. The video is, for example a movie. The process of examining the video may be a manual process.

Trigger data is generated as indicated at block 110, based on the locations identified within the video. The trigger data 120 may be in a variety of forms, and the triggers may be implemented in many ways.

In one embodiment, the trigger data 120 is encoded along with the video and provided on the video disc 160 as is indicated at block 140. The video disc 160 may for example be a DVD, and the video may be a movie. Alternatively, the video disc may also be a Video CD (VCD), DVD-ROM, Divx disc, or any other media providing video data.

For example, a consumer purchases a video disc in accordance with the present disclosure, brings it home, and places it into a video player in accordance with the present disclosure. He switches on the video player and watches the disc content. The movie contains many examples of product placement, from brand name sodas to plush toys. The video disc further comprises triggers which correspond to the display of such products. Logic within the video playback device is configured to recognize these triggers. The triggers in turn cause logic running in the processor to display an indicator to the user. The indicator may be in a variety of forms. With or without pausing the video, an animating graphic of the item appears on the screen, along with a button that reads, "Add to Shopping Cart" or has similar text. By pressing the "Enter" key on his remote control, he selects the "Add to Shopping Cart" button. The processor stores this and all other selections in non-volatile memory in the video player.

In another embodiment, the trigger data 120 is provided separately from the video or video disc 160. For example, the triggers may be provided to the video playback device 180 through an Internet connection 175 and stored in memory on the video playback device 180 for access at a later time. Therefore, the video disc 160 need not contain trigger data 120 on the disc in order to provide the ability to purchase products. Instead, the video playback device 180 requests the trigger data 120 corresponding to the video on the video disc through a communications link 175 such as by utilizing a connection to the Internet 170. The trigger data may be downloaded and saved to memory on the video playback device 180. In another embodiment, a content provider transmits the trigger data to the video playback device without the video playback device requesting the data. Trigger data may for example be stored at a central server 150.

In another example, a consumer purchases a video disc containing for example, a movie, and places it into a video player in accordance with the present disclosure. In this example the video disc does not contain trigger data. The video player, however, is configured to recognize whether or not trigger data is present on the disc. The video player therefore recognizes that no trigger data is present on the disc and therefore requests that trigger data associated with the movie on the disc be transmitted to the video player. This may be done by contacting a content provider, such as central server 150. Trigger data corresponding to the movie, or other video present on a video disc can thereby be downloaded from a remote server to the video player. In another embodiment, it is possible that a content provider transmit trigger data associated with a plurality of videos, to a video player, such that requesting the data is not necessary.

As shown at block 125, in one embodiment, the trigger data comprises one or more triggers, and each trigger comprises a time. The time indicates a time during the video when or where a product offer occurs. For example, trigger data 125 may be compiled as a list of triggers, and saved to a file, such as a text or other file format. In another embodiment, the trigger data comprises one or more database entries saved in a database table.

In yet another embodiment, as shown at block 130, the trigger data comprises a separate track or stream comprising one or more triggers that plays simultaneously with the video. The trigger may be a pointer to data stored elsewhere.

The trigger may further comprise or be associated with additional data relevant to the corresponding product. For example, information such as a detailed description, pictures, or video of the product may be included. Pricing information may also be included. The trigger may further also include a URL, address, or link to a web site where the product may be purchased. In some embodiments, the trigger itself contains the information. In other embodiments, the trigger simply contains a link to the additional data.

The video playback device 180 may be similar to a DVD player, a High-Definition video player or a personal computer. In one embodiment, the player contains a programmable processing unit. In one embodiment, the player comprises an Internet connection, though the device need not be always connected. The video playback device further comprises a user interface device such as a remote control.

Figure 2:
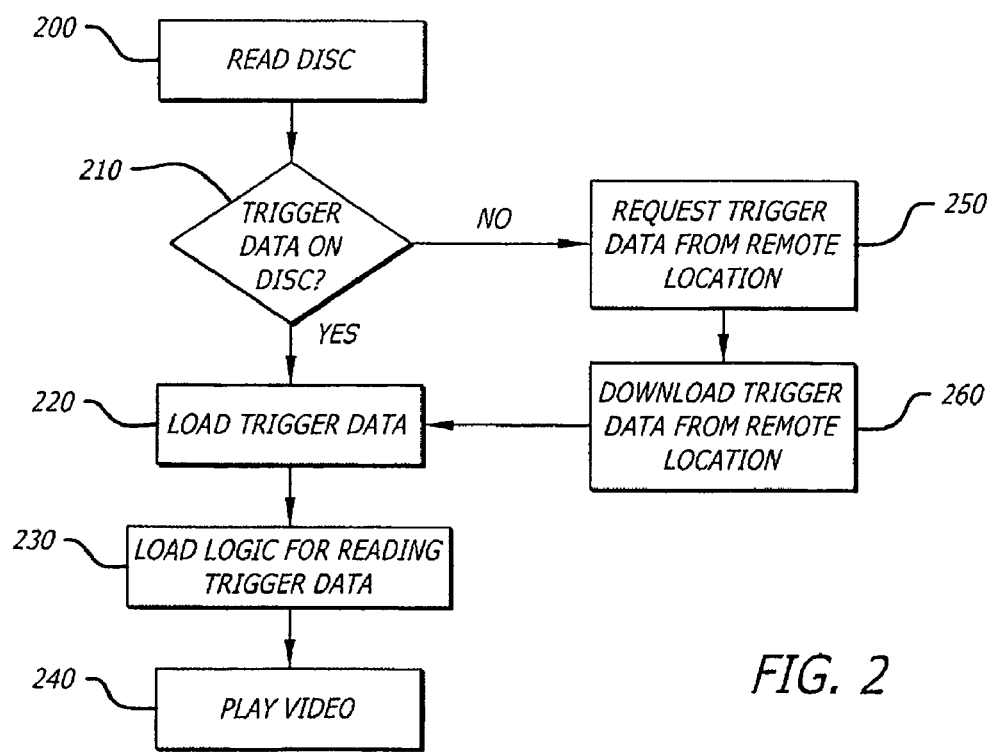
FIG. 2 is a block flow diagram of an exemplary embodiment.

FIG. 2 is a block flow diagram illustrating some of the steps involved in an exemplary video commerce method in accordance with the present disclosure The video player reads the contents of a disc as indicated at block 200. The video player recognizes whether or not there is trigger data located on the disc at block 210. If trigger data is present, the video player loads the software logic required to recognize the trigger and/or trigger data at 220 and proceeds to play the video on the disc at 230.

If trigger data is not present on the disc, the video player may be configured to request the data from a remote location as is indicated at block 250, perhaps from a server that can be accesses through the Internet. The trigger data is then downloaded to the video player as indicated at block 260.

The video player may be capable of recognizing different types of trigger data, as has been described thus far. For example, the video player may be capable of recognizing trigger data that is located in a file or database, as well as trigger data in the form of a separate stream played simultaneously with the video stream.

Figure 3:
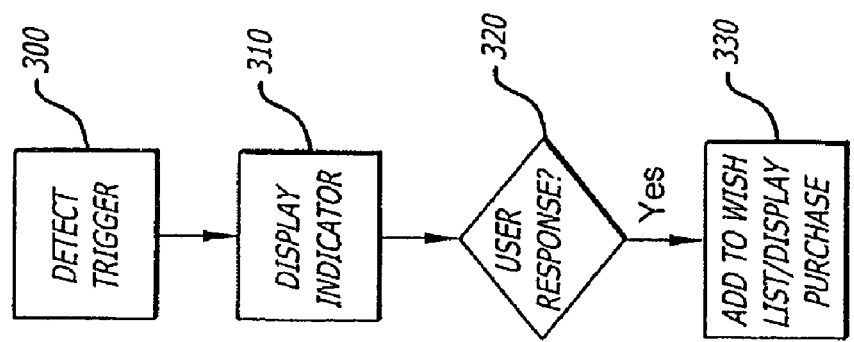
FIG. 3 is a block flow diagram of an exemplary embodiment.

FIG. 3 is a block flow diagram illustrating an exemplary embodiment in accordance with the present disclosure. The video player comprises software and hardware capable of detecting triggers, as indicated at block 300. When a trigger is detected, the video player displays an indicator to the viewer, as indicated at block 310. The indicator may be in a plurality of forms—from a simple display or an icon and/or sound to a more complex menu system which allows the user to interact or respond to the "offer."

Figure 4:
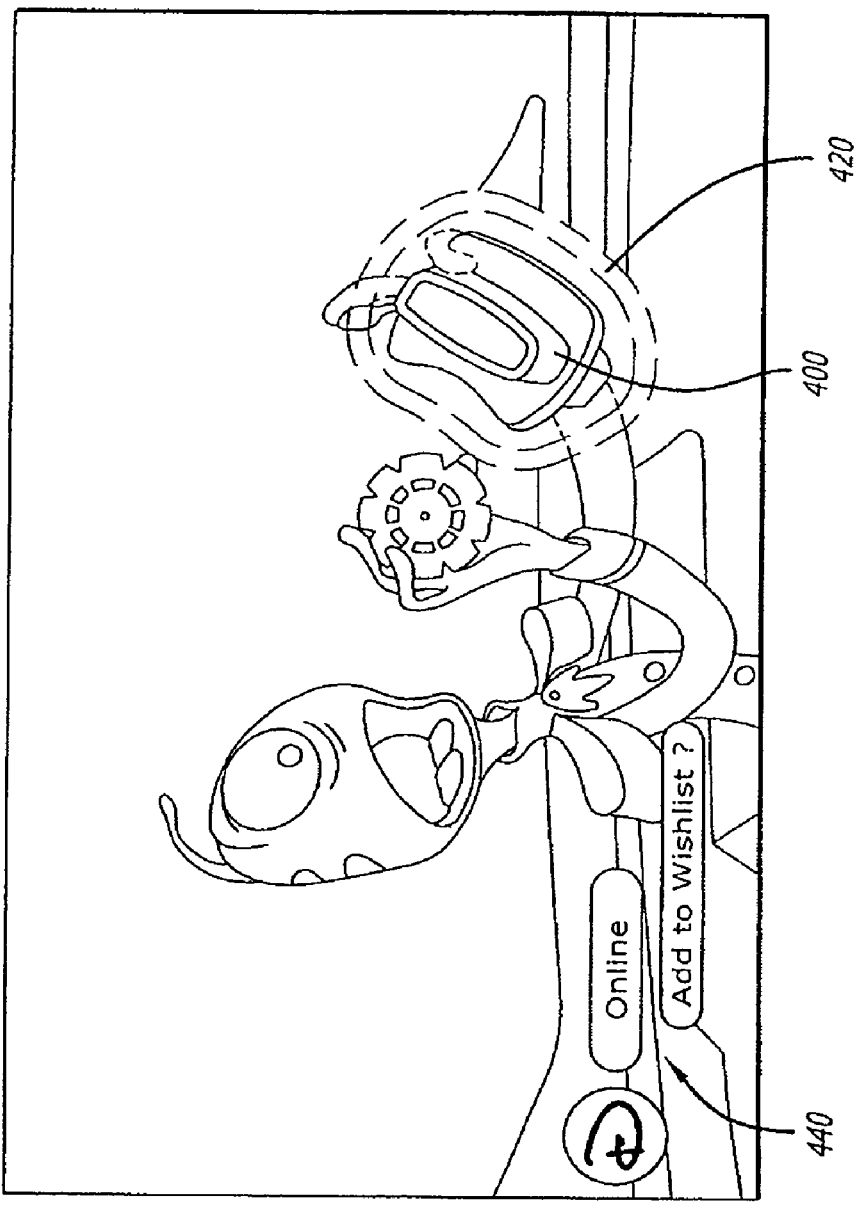
FIG. 4 is an screen shot illustrating an exemplary embodiment of the present disclosure.

An exemplary screen shot from a video disc in accordance with the present disclosure is included in FIG. 4. In FIG. 4, a video such as a movie is being displayed. A product available for purchase is indicated at 400. In the figure, the product appears as if it is glowing. Normally, the product does not appear to be glowing in the movie. However, in this embodiment, the "glow" 420 surrounding the product 400 is the indicator to the user that this is a product available for purchase.

Furthermore, a menu appears in the lower portion of the screen, prompting the user as to if they would like to purchase the product. Block 320 of FIG. 3 indicates that the video player may await a response from the user. In this embodiment, the user is prompted to add the product to a wish list, as indicated by menu options 440, and also indicated at block 330 of FIG. 3. Once the video program has ended, the user can review the wish list and choose to either purchase everything in the wish list, or only selected items. The video player then connects to the Internet and submits the purchase requests through Internet protocols to the e-commerce site or sites specified for each item. This submits billing and the delivery information securely to the e-commerce sites and the transactions are concluded.

In one embodiment, the video disc comprises a menu system whereby the user selects whether or not to display such purchase options. Thereby, the video disc may include a "standard" mode that displays just the video, and an enhanced mode that displays the video as well as the indicators and prompts for purchase of products.

In another implementation of this invention, a different button appears over the video. This is the "Buy Now" button. If the user selects this button, the purchase request is not necessarily stored in non-volatile memory, but a purchase request is immediately sent to the appropriate e-commerce site. There may be a further modification of this interface where "Yes" or "No" confirmation buttons appears after clicking the "Buy Now" button. Clicking "No" returns the user to the movie, while clicking "Yes" orders the appropriate item.

Through the remote control, the user may ask for more information regarding the product. Again without pausing the video, the processor can retrieve extra product information stored in memory, the video data, non-volatile storage or from the Internet.

This type of implementation would also allow the user dynamic control over the multimedia assets of this de-facto interactive catalogue. Using the arrow keys on a remote control or keyboard, the user might rotate a 3D representation of a product in order to evaluate the item from all sides.

The foregoing description of the preferred embodiments of the invention has been presented for the purposes of illustration and description. It is not intended to be exhaustive or to limit the invention to the precise form disclosed. Many modifications and variations are possible in light of the above teaching. For example, the various activities and supplemental features described herein may be provided to users on storage media other than DVDs. The product may also be supplemented by features and supplemental content other than those described herein. It is intended that the scope of the invention be limited not by this detailed description, but rather by the claims appended hereto.

What is claimed is:

1. A method for use by a video disc player for offering a product shown in a video for purchase, the method comprising:

examining a disc containing the video to determine whether the disc contains trigger data associated with the video;

requesting the trigger data associated with the video from a remote server if the examining determines that the disc does not contain the trigger data associated with the video;

downloading the trigger data associated with the video from the remote server using a network connection;

storing the trigger data associated with the video in a memory of the video player, wherein at least one trigger data includes a time indicating when a trigger is to occur during the playing of the video on the disc, the at least one trigger corresponding to the display of a product shown in the video;

displaying the video from the disc;

displaying an indicator when the at least one trigger data is recognized to be displayed to indicate that the product displayed in the video is available for purchase; and providing a user interface configured to allow the user to select the product for purchase.

2. The method of claim 1 wherein the video is a movie.

3. The method of claim 1 further comprising:

prompting the user for adding the product to a wish list;

adding the product to the wish list in response to a response by the user to the prompting; and continuing to display the video until the user requests to visit the wish list.

4. The method of claim 1 wherein the user interface is a remote control.

5. The method of claim 1 further comprising providing information about the product featured in the video.

6. The method of claim 1 wherein the indicator is a graphic that appears over the video.

7. A video disc player for offering a product shown in a video for purchase, the video disc player comprising:
- a processor adapted to examine a disc containing the video to determine whether the disc contains trigger data associated with the video;
- the processor further adapted to request the trigger data associated with the video from a remote server if the processor determines that the disc does not contain the trigger data associated with the video;
- the processor further adapted to download the trigger data associated with the video from the remote server using a network connection;
- a memory adapted to store the trigger data associated with the video, wherein at least one trigger data includes a time indicating when a trigger is to occur during the playing of the video on the disc, the at least one trigger corresponding to the display of a product shown in the video;
- the processor further adapted to display the video from the disc, and display an indicator when the at least one trigger data is recognized to be displayed to indicate that the product displayed in the video is available for purchase, and providing a user interface configured to allow the user to select the product for purchase.

8. The video disc player of claim 7 wherein the video is a movie.

9. The video disc player of claim 7, wherein the processor is further adapted to prompt the user for adding the product to a wish list, add the product to the wish list in response to a response by the user to the prompting, and continue to display the video until the user requests to visit the wish list.

10. The video disc player of claim 7, wherein the user interface is a remote control.

11. The video disc player of claim 7, wherein the processor provides information about the product featured in the video.

12. The video disc player of claim 7, wherein the indicator is a graphic that appears over the video.

* * * * *